United States Patent [19]

Stackhouse

[11] Patent Number: 4,460,521

[45] Date of Patent: Jul. 17, 1984

[54] CROSSFLOW COOLING TOWER FILL SECTION

[75] Inventor: David W. Stackhouse, Sebastopol, Calif.

[73] Assignee: Ecodyne Corporation, Santa Rosa, Calif.

[21] Appl. No.: 369,485

[22] Filed: Apr. 19, 1982

[51] Int. Cl.³ .................................................. B01F 3/04
[52] U.S. Cl. .............................. 261/111; 261/DIG. 11
[58] Field of Search ............................... 261/109–112, 261/DIG. 11, DIG. 77

[56] References Cited

U.S. PATENT DOCUMENTS

| | | | |
|---|---|---|---|
| 1,320,852 | 11/1919 | Goubert | 261/111 |
| 1,674,764 | 6/1928 | Dauphinee | 261/112 |
| 2,394,755 | 2/1946 | De Flon | 261/109 |
| 3,917,764 | 11/1975 | Phelps | 261/DIG. 11 |
| 3,983,190 | 9/1976 | Norback | 261/DIG. 11 |
| 4,115,484 | 9/1978 | Saxton | 261/111 |
| 4,317,785 | 3/1982 | Dickey, Jr. et al. | 261/111 |
| 4,385,011 | 5/1983 | Skold | 261/DIG. 11 |

FOREIGN PATENT DOCUMENTS

| | | | |
|---|---|---|---|
| 656559 | 5/1929 | France. | |
| 481276 | 3/1938 | United Kingdom | 261/DIG. 11 |
| 518373 | 2/1940 | United Kingdom | 261/DIG. 11 |

*Primary Examiner*—Richard L. Chiesa
*Attorney, Agent, or Firm*—Dressler, Goldsmith, Shore, Sutker & Milnamow, Ltd.

[57] ABSTRACT

A fill section arrangement for crossflow cooling towers which utilizes a mixture of high density fill strip regions and low density fill strip regions. The regions of the fill section which include the high density fill strips are those regions which have the highest enthalpy driving forces.

8 Claims, 6 Drawing Figures

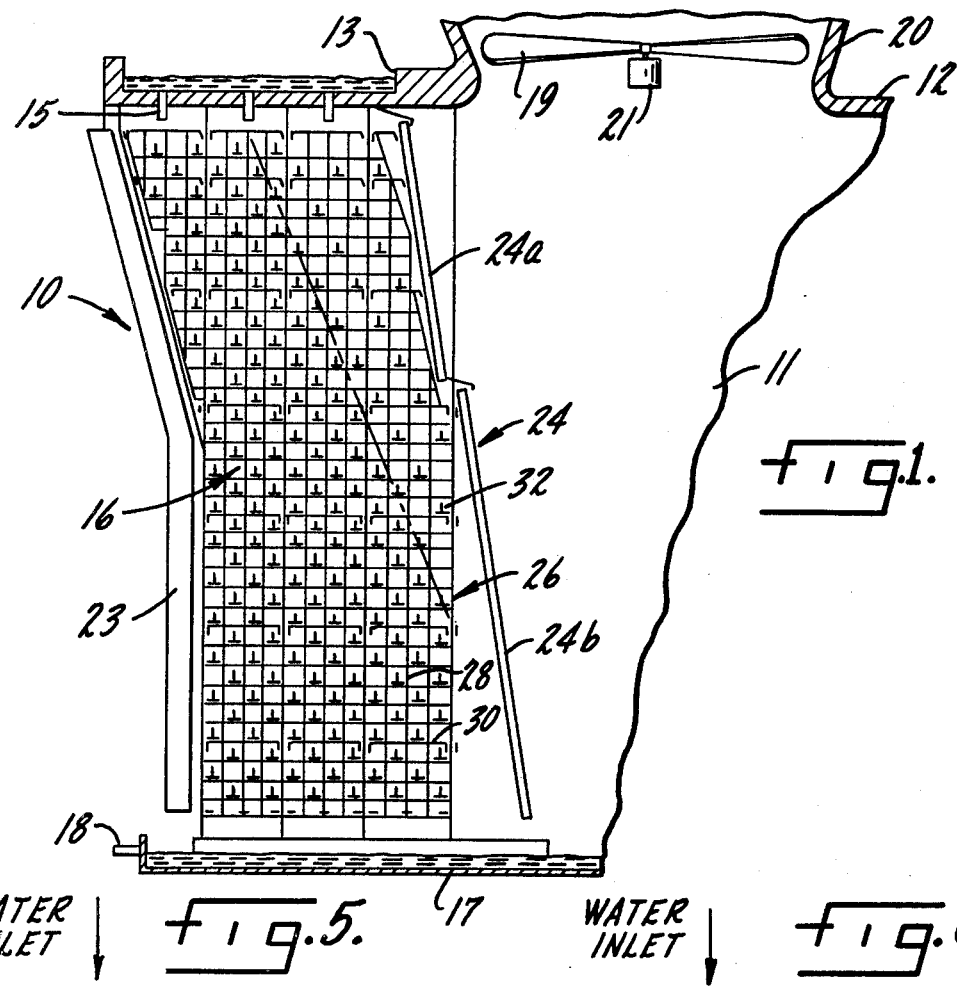
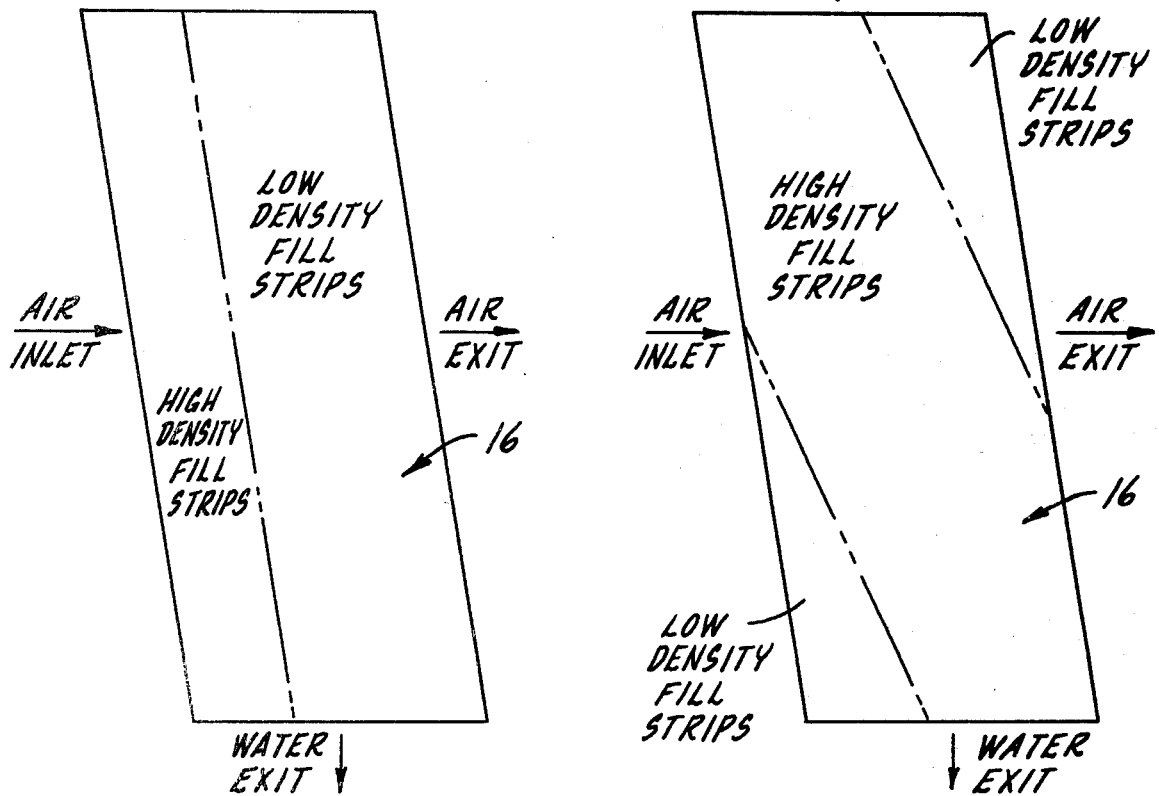

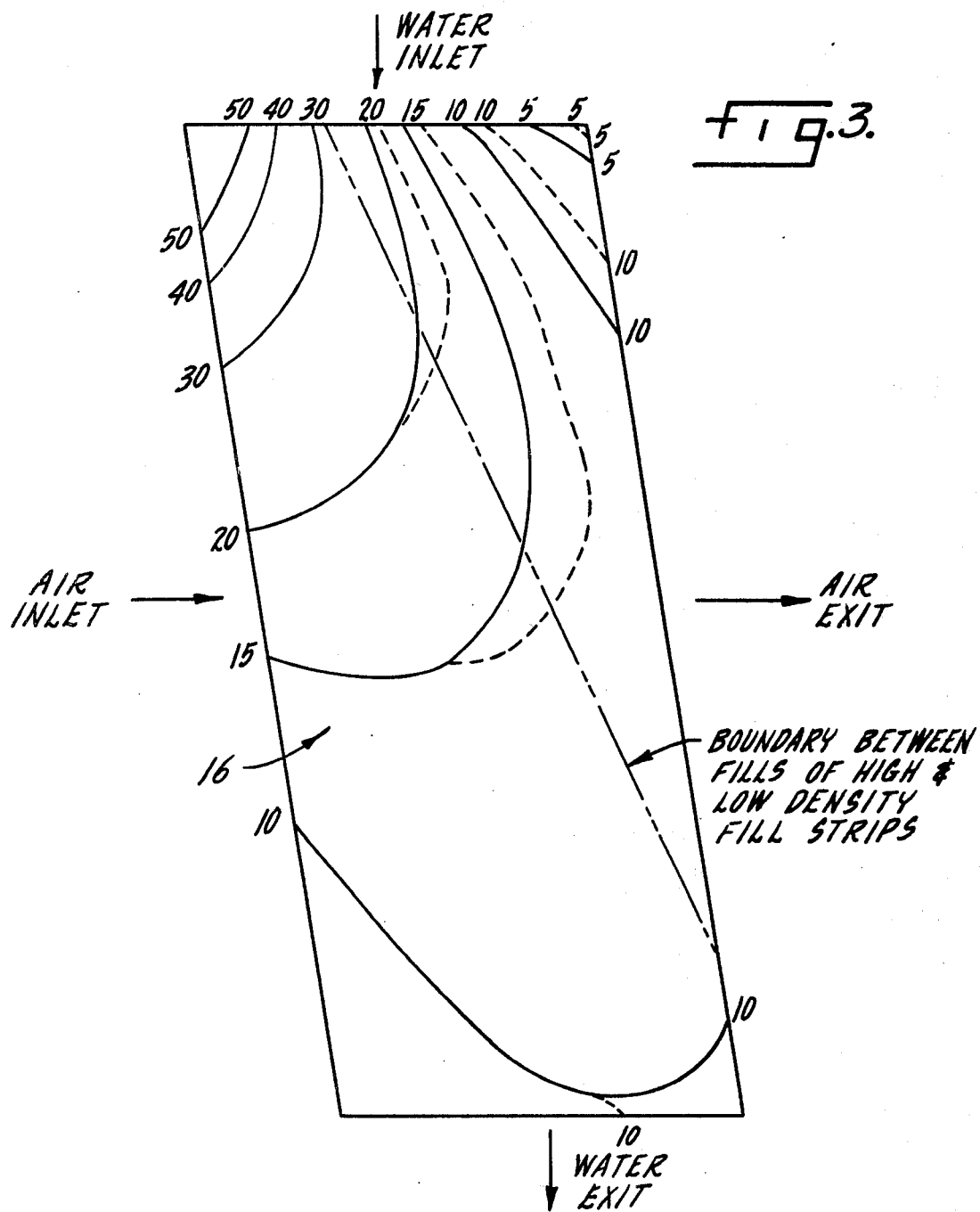

CROSSFLOW COOLING TOWER FILL SECTION

BACKGROUND OF THE INVENTION

This invention relates generally to crossflow liquid cooling towers and more particularly to an improved splash fill strip arrangement for use in crossflow cooling tower installations.

Crossflow cooling towers typically are constructed to have a basic shell or enclosure on two vertical end walls, with louvered openings located at the two opposite side walls to pass air laterally into the tower interior. At the top of the tower are one or more fans rotating in shrouds or housings for discharging heated air from the tower; and along each side are hot water distribution basins. Hot water from the latter is distributed by metering orifices to fall within the fill sections of the tower, wherein it is broken up into droplets by splashing on the fill strips, the water also filming on such strips. The air cooled water is ultimately collected in a cool water basin structure at the bottom of the tower, for recirculation to the heat source.

Cooling is accomplished essentially by evaporation from the surface of droplets and films, and by sensible heat transfer from water surfaces to the circulating air. The air velocity through the fill section, and the elapsed time of free fall of water through the fill section are of importance in effecting the heat transfer. The fill strip configuration and spacing relative to adjacent fill strips determines, to a degree, the time of fall. The more closely spaced or packed the fill strips, the longer the water is exposed to the air currents within the tower, with resulting greater evaporation and sensible heat transfer to the air. As a practical limit to the amount of fill strips utilized, the pressure drop of air through the fill increases with the amount of fill strips, requiring more fan horse power to maintain such air movement. Further, the fill strip configuration and spacing determines the rate and extent of water splash and resulting breakup into water particles. The greater the breakup, the greater the exposure of water droplets to circulating air; hense, the greater the heat transfer.

In most crossflow cooling tower designs the fill assembly includes a grid-type fill hanger or support upon which the fill strips are supported. The fill hanger may take many different forms, such as those disclosed in U.S. Pat. Nos. 3,749,381, 4,115,484, 4,181,692 and 4,181,693. In general, all of these fill hangers form grids defined by interconnected vertical and horizontal members. The fill strips may likewise take many different forms, such as those disclosed in U.S. Pat. Nos. 2,497,389, 3,389,895, 3,468,521, 3,647,191, 3,758,088, 4,020,130 and 4,133,851. The differences in these fill strip designs are subtle, but nevertheless critical to the performance and cooling efficiency of the tower.

Previous installations of splash type fills in crossflow cooling towers have generally used one type of splash fill throughout the tower fill section. In order to obtain maximum performance from a given volume of fill section, a very tightly packed array of such fill strips was used. This procedure offers very good performance but at high cost, and it causes considerable resistance to the flow of air through the fill section. Typical splash fill strips performance is such, that, the doubling of the density (number of fill strips per unit volume) of the fill strips in the fill sections will increase the heat transfer rate by only ten to twenty percent, while adding twenty to forty percent to the resistance to the flow of air through the fill section.

It has heretofore been proposed in prior art patents to provide fill sections in crossflow cooling towers which include areas of high density fill and areas of low density fill. Examples of such fill section arrangements are shown in U.S. Pat. Nos. 2,394,755, 4,115,484, 1,674,764, 1,320,852 and British Pat. No. 481,276. The areas of the high density fill in all of these arrangements are spaced from the region of the fill section which is adjacent to the air inlet. For reasons which will hereinbelow become very apparent, these arrangements do not maximize the potential performance characteristics of the high density fill. In French Pat. No. 656,559 a counterflow cooling tower is disclosed wherein the lower sections of splash plates which are adjacent to the air inlet are spaced closer together than the upper sections of splash plates. However, the thermal characteristics of the water and air passing through a counterflow tower differs from that present in a crossflow tower.

SUMMARY OF THE INVENTION

The invention provides a unique arrangement of splash type fill in crossflow cooling towers which allows considerable savings in the amount of fill material required without materially sacrificing thermal performance.

It has been discovered that, in a crossflow cooling tower, air and water temperatures vary continuously in both the vertical and horizontal directions. The temperature gradients are largest at the top of the fill section adjacent to where the air enters. In this region of the fill section, the water is at its highest temperature and the air is at its lowest temperature. This large temperature difference gives rise to rapid exchange of heat between the air and water streams, and corresponding rapid changes in their temperatures, with the water temperature decreasing and the air temperature increasing. These temperature changes mean that the heat transfer between the air and water streams will occur at reduced rates elsewhere in the fill section as a result of reduced temperature difference between the air and the water. The heat transfer driving force can be as much as ten times higher in the upper region of the fill section near the air inlet than in other regions of the fill section.

In accordance with the present invention, the density of the fill strips in this upper region of the fill section adjacent the air inlet is increased, since a rather small increase in fill performance yields in this region a relatively large change in water temperature. While, in other regions of the fill section where the driving forces are much lower, the density of the fill strips is lower, since use of higher density fill strips will produce only a slightly greater change in water temperature at considerable additional cost in materials and labor and with additional air flow resistance, which is related to energy costs for operation of the tower.

In accordance with one preferred embodiment of the invention, approximately seventy percent of the volume of the fill section is packed with high density fill strips, while the remaining thirty percent is packed with low density fill strips. The high density fill strips occupy the entire region of the fill section adjacent to the air inlet and also the region across the entire bottom portion of the fill section. The low density fill strips occupy the regions of the fill section which are above the bottom portion of the fill section and are adjacent to the air exit edges of the fill section. This arrangement allows for all of the water to fall through the high density fill strips for at least a portion of its travel through the fill section. This means that water which has traveled through the low density fill strips enters the high density fill strips at a slightly higher temperature than it would have had at the same location if the fill section were only of the high density fill strips. This higher temperature contributes to higher driving forces in the high density fill strips which allows its superior performance characteristics to be used to maximum advantage to produce a greater change in water temperature than would occur in the same region of the fill section if only the higher density fill strips were used. This feature tends to compensate for the loss in performance caused by the use of the low density fill strips.

As will hereinbelow become more apparent, the teachings of the present invention are susceptible to other combinations of the high density fill strips and the low density fill strips, and other embodiments thereof will be further discussed.

BRIEF DESCRIPTION OF THE DRAWINGS

FIG. 1 is a partial vertical section taken through a crossflow cooling tower incorporating a fill section arrangement in accordance with a first embodiment of the invention;

FIG. 3 is a graph showing in solid lines the lines of constant enthalphy difference for an exemplary fill section packed entirely with the high density fill strips and in broken lines the lines of constant enthalphy difference for the fill section packed with a mixture of high density fill strips and low density fill strips in accordance with the arrangement in FIG. 1.

FIG. 5 is a schematic representation of a second embodiment of a fill section arrangement in accordance with the invention.

FIG. 6 is a schematic representation of a third embodiment of a fill section arrangement in accordance with the invention.

DESCRIPTION OF PREFERRED EMBODIMENTS

Figure 2:
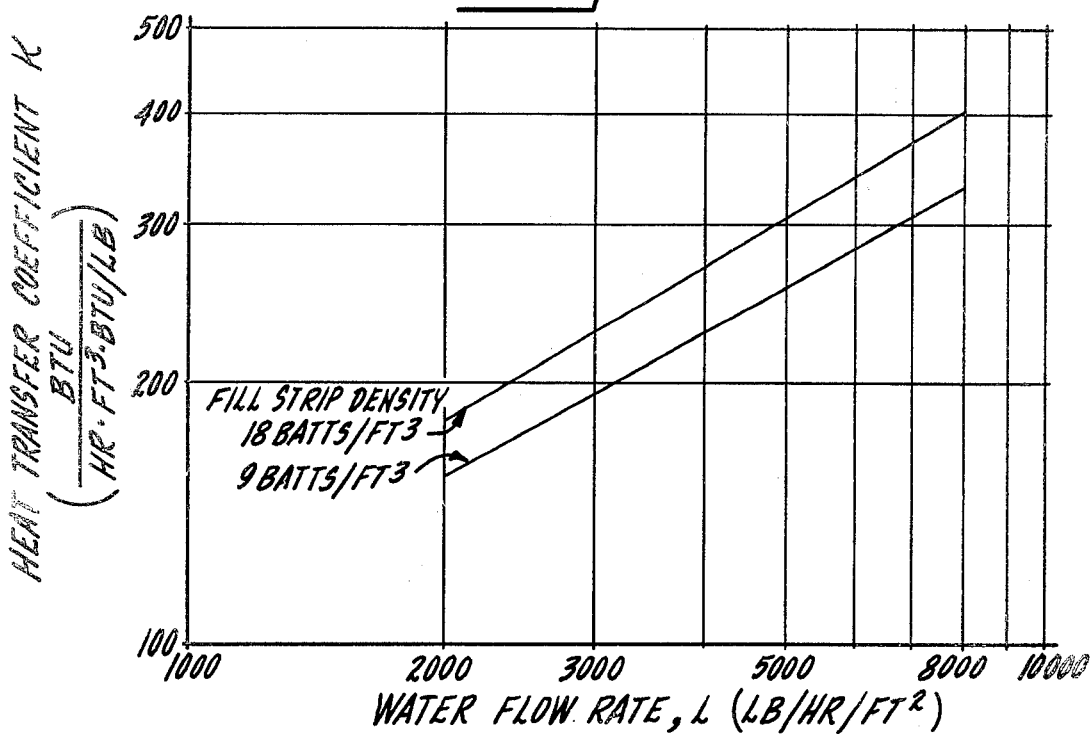
FIG. 2 is a graph showing the value of the heat transfer coefficient K plotted against the water flow rate of a particular fill strip design, which is packed in a crossflow cooling tower with high density fill strips and with low density fill strips, wherein the air flow rate is 2000 lbs. dry air/HR/FT$^2$.

Referring to FIG. 1, a crossflow cooling tower 10 is shown as having a housing 11 incorporating a top 12 defining a hot water distributing pan 13. Liquid, such as water to be cooled, is pumped into pan 13 from which the liquid drains via suitable nozzles 15. After descending through the splash fill section 16, the liquid is collected in basin 17 for removal at outlet 18.

A fan 19, rotatable in stack 20 by drive 21, draws air laterally through the tower for upward discharge via stack 20. The air passes successively through openings between housing side inlet louvers 23, the fill section 16 and through drift eliminator 24. In FIG. 1 the drift eliminators appear in two groups, 24a and 24b.

The fill section 16 is strung with vertically hanging fill hangers 26 consisting of a plurality of vertical and horizontal wires or rods 28 and 30, respectively, spaced at intervals throughout the fill section 16. Splash fill strips 32 are positioned and supported on the horizontal wires 30. Various embodiments of the splash fill strips 32 are available, an example of which is disclosed in U.S. Pat. No. 4,133,851. The particular spacing of the fill strips 32 within various regions of fill section 16 is in accordance with the present invention and based on the technical discussion which hereinbelow follows.

As previously stated, heat transfer in a cooling tower results from a combination of sensible heat transfer between the water and the air and evaporation of the water with accompanying removal of heat from the bulk of the water. The latent heat of water is so large that evaporation is by far the dominant mechanism of heat transfer. Merkel demonstrated in 1925 that, for air-water systems at relatively low temperatures, the rather complex heat and mass transfer equations involved can be approximated as a single transfer process using enthalpy difference as the driving force. In crossflow towers the air and water conditions are a function of both vertical and horizontal position in the tower and a two-dimensional analysis therefore must be used.

Two differential equations have been derived for crossflow towers:

(1) HEAT BALANCE EQUATION $$C_w L \partial T_w / \partial y = G \partial H_a / \partial x$$

where
$C_w$ = specific heat of water
$L$ = water mass flow rate per unit horizontal area
$T_w$ = water temperature
$y$ = vertical direction
$G$ = air mass flow rate per unit vertical area
$H_a$ = air enthalpy
$x$ = horizontal direction This equation relates the rate of decrease of water temperature in the vertical direction to the rate of increase of air enthalpy in the horizontal direction.

(2) HEAT TRANSFER EQUATION $$q = K \partial x \partial y (H_w - H_a)$$

where
q = amount of heat transferred in an incremental volume
K = heat transfer coefficient
$H_w$ = enthalpy of air saturated at the local water temperature This equation is analogous to the conventional sensible heat transfer equation. An enthalpy difference has been used as the driving force instead of the usual temperature difference.

These equations are combined into a third equation:

$$L \partial T_W / \partial y = K(H_w - H_a)$$

This equation relates the rate of decrease of water temperature to the magnitude of the local enthalpy driving force. These equations in conjunction with the thermodynamic property equations for water and air can be solved numerically to yield water and air conditions throughout the fill section under any specified conditions of water and air flow rates and water and air inlet temperatures.

The heat transfer coefficient, K, must be known in order to perform the calculations. K is an empirically determined variable which is a function of the water and air flow rates. Typical plots of K are shown in FIG. 2, for one type of splash fill strip 32, installed at two different densities (number of fill strips per unit volume). The upper line is for a high density spacing of eighteen fill strips per cubic foot and the lower line is for a low density spacing of nine fill strips per cubic foot. In this particular example, the doubling of the density of the fill strips increases the value of K by only approximately twenty percent. Different fill strip designs may have a different relationship between K and the density of the fill strips.

In a typical tower design as shown in FIG. 1, having a fill section 16 sixteen feet wide by thirty eight feet high, which is packed with low density fill strips (nine fill strips per cubic foot), and wherein $L=8000$ $LB/HR/FT^2$, $G=2000$ lb. dry air/$HR/FT^2$, water inlet temperature at 120° F., and air inlet temperature at 70° F. wet bulb temperature, the water outlet temperature is calculated to be 90.9° F. Under the same operating conditions, however, with the fill section 16 packed with high density fill strips (eighteen fill strips per cubic foot), the water outlet temperature is calculated to be 89.7° F. This 1.2° F. reduction in outlet water temperature represents a four percent increase in heat transfer by using the high density fill strips over the low density fill strips. However, it is achieved at the cost of using twice the amount of fill material and installation labor and at an increase in operating costs due to a thirty eight percent increase in resistance to air flow associated with using the more dense fill arrangement.

Using the same operating conditions as stated above, FIG. 3 shows in solid lines the distribution of the enthalpy driving forces throughout the fill section 16 when packed entirely with the high density fill strips. It will be noted that there is a region of relatively large driving force at the upper region of the fill section 16 adjacent to where the air enters the fill section. This is where the water is at its highest temperature and the air is at its lowest temperature, which gives rise to the greatest driving force. It will also be noted that there are large regions of the fill section across the bottom portion of the fill section 16 and at the upper portion of the fill section 16 adjacent to where the air exits the fill section which have relatively low driving forces. In these regions either the water has been cooled or the air heated sufficiently to reduce the driving force.

In accordance with the teachings of the present invention, it is proposed to employ regions of high density fill strips and regions of low density fill strips. Referring to FIG. 1, in accordance with the presently considered preferred embodiment, the region of high density fill strips is the area to the left of the phantom line and the region of low density fill strips is the area to the right of the phantom line. That is, the region of the fill section 16 adjacent to the air inlet louvers 23 and adjacent to the basin 17 are packed with high density fill strips, while the remainder of the fill section 16 is packed with low density fill strips. The region of low density strips has a transfer rate about twenty percent less than it would have had the high density fill strips been placed therein. However, since the low density fill strips are installed in regions in the fill section 16 where the driving forces are low, only a small portion of the total heat transfer capability of the entire fill section is sacrificed.

In the example used to develop FIG. 3, the region where the low density fill strips are installed contributes only about twenty five percent of the total heat transfer when the region is occupied by the high density fill strips, even though it constitutes about thirty percent of the total volume of the fill section 16. When the low density fill strips are substituted in this region, it contributes only twenty percent of the original total amount of heat transfer if the driving forces remained constant. Accordingly, this reduction in performance in the region of the fill section 16 with low density fill strips results in only a five percent reduction in total heat transfer throughout the fill entire fill section 16. Put another way, the total amount of fill strips is reduced by fifteen percent with only a five percent loss in heat transfer. This represents a 0.33 percent loss in heat transfer per percent savings in fill strip material, while the fifty percent savings with twenty percent loss in heat transfer which would result from using the low density fill strips throughout the fill section 16 (assuming no increase in driving forces) represents a 0.44 percent loss in heat transfer per percent savings in fill strip material. A smaller portion of the heat transfer capability of the entire fill section 16 is lost as a result of the use of the low density fill strips than would normally be expected because the low density fill is located in regions of low driving forces. This is an important feature of the present invention.

A second, and even more important feature of the invention is the fact that the driving forces do not remain the same but increase in the regions where the low density fill strips are located. This is the natural result of the reduced heat transfer rate in the low density fill strips. Since the heat transfer rate is reduced, the air is heated and the water cooled less rapidly, which results in increased enthalpy differences. This increased driving force tends to increase heat transfer and compensate for the reduced capability of the low density fill strips. This is the reason why the difference in heat transfer between the situation in which the entire fill section 16 is packed entirely with high density fill strips, as compared with the situation in which the fill section 16 is packed entirely with low density fill strips, is only four percent instead of twenty percent, as would be expected due to the difference in fill strip performance.

The driving force is increased in the regions where the low density fill strips are used, relative to what it would have been had the high density fill strips been installed in those regions. This tends to compensate for reduced heat transfer capability and results in increased heat transfer in the regions packed with the low density fill strips. However, the increase in heat transfer is not sufficient to compensate for the entire loss of thermal performance. This means that water falling out of the regions packed with the low density fill strips will be at a higher temperature than if these regions were packed with the high density fill strips. However, if the fill section 16 is packed as disclosed in FIG. 1, the water leaving the regions of low density fill strips enters a region of high density fill strips, which increases the driving forces in these regions of high density fill strips. Referring to FIG. 3, the effect on the driving forces throughout the fill section 16, as arranged in FIG. 1, is shown by broken lines in the FIG. 3. The regions of relatively high driving forces is expanded significantly in the regions packed with the low density fill strips and, to a lesser extent, in the regions packed with the high density fill strips. This increase in the driving forces in the regions packed with high density fill strips is important because it increases the heat transfer in these regions, which tends to compensate for lost heat transfer in the regions packed with the low density fill strips.

Figure 4:
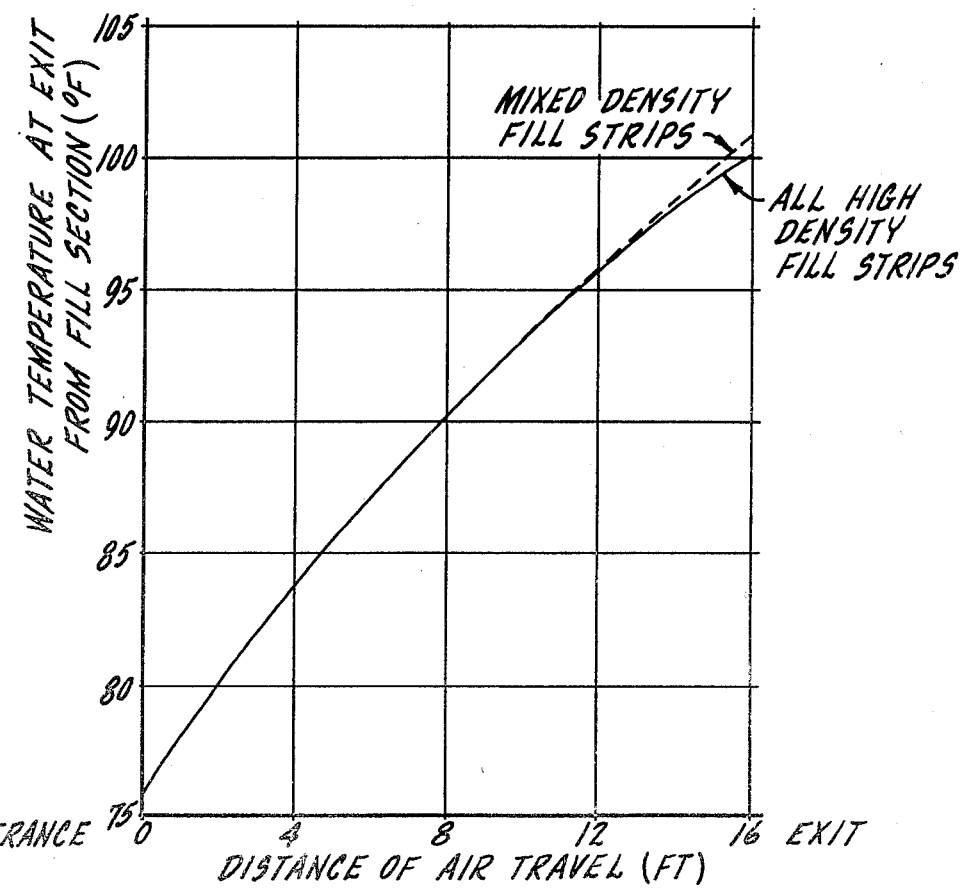
FIG. 4 is a graph showing in a solid line the outlet water temperature profile of the exemplary fill section packed entirely with the high density fill strips and in a broken line the fill section packed with a mixture of high density fill strips and low density fill strips in accordance with the arrangement in FIG. 1.

The net result of all of these effects is that the arrangement of fill section 16, as illustrated in FIG. 1, provides considerable cost savings by use of low density fill strips in certain regions, with very little loss in heat transfer capability. Referring to FIG. 4, the graph illustrates the temperature of the water as it exits from the bottom of the fill section 16 as a function of the location in the fill section. The solid line designates the instance in which the fill section 16 is packed entirely with high density fill strips and the broken line designates the instance in which the fill section 16 is packed with a mixture of high and low density fill strip, in accordance with the embodiment illustrated in FIG. 1. The fill section 16 in accordance with the FIG. 1 embodiment produces water which is a maximum of 0.5° F. warmer at the air exit side than if the fill section 16 where packed entirely with the high density fill strips. More meaningful, the average outlet temperature of the water from the fill section 16 packed in accordance with the FIG. 1 embodiment is 89.8° F. or only 0.1° F. warmer than the average outlet temperature of the water from the fill section 16 packed entirely with the high density fill strips.

This small increase is a small price to pay for a savings of approximately fifteen percent in the cost of the fill strip material and installation. Further, the resistance to air passing through the fill section 16 is reduced as compared to if the fill section were packed entirely with the high density fill strips. This feature can be used to either reduce the tower operating costs or to increase the amount of air which can be moved through the fill section for a given operating cost. If the latter option is chosen, the increased amount of air will increase heat transfer throughout the fill section and will accordingly further reduce the already small performance penalty associated with the use of the low density fill strips.

The presently considered preferred embodiment of the invention, as disclosed above and illustrated in FIG. 1, is not the only embodiment which may be employed to take advantage of the teachings of the invention. Other fill arrangements which include a mixture of the high and low density fill strips may be used. Examples of two such other fill strip arrangements are shown in FIGS. 5 and 6. The arrangement shown in FIG. 5 employs the high density fill strips only in the region of the fill section 16 which is adjacent to the air inlet. The arrangement shown in FIG. 6 employs the high density fill strips in the upper region of fill section 16 which is adjacent to the air inlet and in the lower region of the fill section which is adjacent to the air outlet. In this arrangement all of the liquid which falls through the fill sections passes through a region of high density fill strips. The invention contemplates even other arrangements and the changing of the relative proportions of the two fill strip densities. The operating conditions, type of fill strips, and the economics of a particular situation will dictate the choice. Some situations may require a high performance design such as that shown in FIG. 1 and, therefore, allow only a relatively small cost savings. Other situations may not require such high performance and may allow the use of designs similar to those shown in FIGS. 5 and 6, which although they do not take full advantage of all of the teachings of the invention, offer savings in the amount of fill strip material required and/or in the ease of installation. Even further, the present invention contemplates the use of more than two different densities of fill strips and the use of different types of fill strips to take advantage of the teachings of the invention.

Various modifications are contemplated and may obviously be resorted to by those skilled in the art without departing from the spirit and the scope of the invention, as hereinafter defined by the appended claims, as only preferred embodiments thereof have been disclosed.

What is claimed is:

1. In a crossflow liquid cooling tower in which air flows generally horizontally through a fill section positioned within the tower in cooling relationship with a liquid descending generally vertically through said fill section, said tower having at least one side wall having an air inlet for directing air into an inlet region of said fill section over substantially the entire height thereof and an air outlet for removing air from an outlet region of said fill section; an improved splash-type fill assembly positioned within said fill section, comprising: a plurality of spaced apart vertically suspended fill hangers supported within said fill section; and a plurality of splash-type fill strips positioned within said fill section and supported on said fill hangers, said fill strips which are positioned in the upper portion of said inlet region having high enthalpy driving forces are packed with a greater density than are the fill strips which are positioned in the upper portion of said outlet region having low enthalpy driving forces.

2. The invention as defined in claim 1 wherein the fill strips which are positioned in the entire of said inlet region are packed with a greater density than the fill strips which are positioned in the upper portion of said outlet region.

3. The invention as defined in claim 1 wherein the fill strips which are positioned in the lower portions of said inlet region and said outlet region are packed with a greater density than the fill strips which are positioned in the upper portion of said outlet region.

4. The invention as defined in claim 1 wherein the fill strips which are positioned in the lower portion of said outlet region are packed with a greater density than the fill strips which are positioned in the upper portion of said outlet region.

5. The invention as defined in claim 1 wherein substantially all of the liquid falling through said fill section passes through a region of said fill section which is packed with said fill strips of greater density.

6. The invention as defined in claim 1 wherein the density of the fill strips which are positioned in the upper portion of said inlet region are approximately twice the density of the fill strips which are positioned in the upper portion of said outlet region.

7. The invention as defined in claim 6 wherein said fill strips which are positioned in the upper portion of said inlet region have a density of approximately eighteen fill strips per cubic foot and the fill strips which are positioned in the upper portion of said outlet region have a density of approximately nine fill strips per cubic foot.

8. The invention as defined in claim 1 wherein the greater density fill strips are positioned in approximately seventy percent of the volume of said fill section.

* * * * *